Feb. 20, 1945.   A. N. CLOUTIER   2,369,774
METHOD OF KNITTING
Original Filed May 29, 1943   6 Sheets-Sheet 3
FIG. 6.
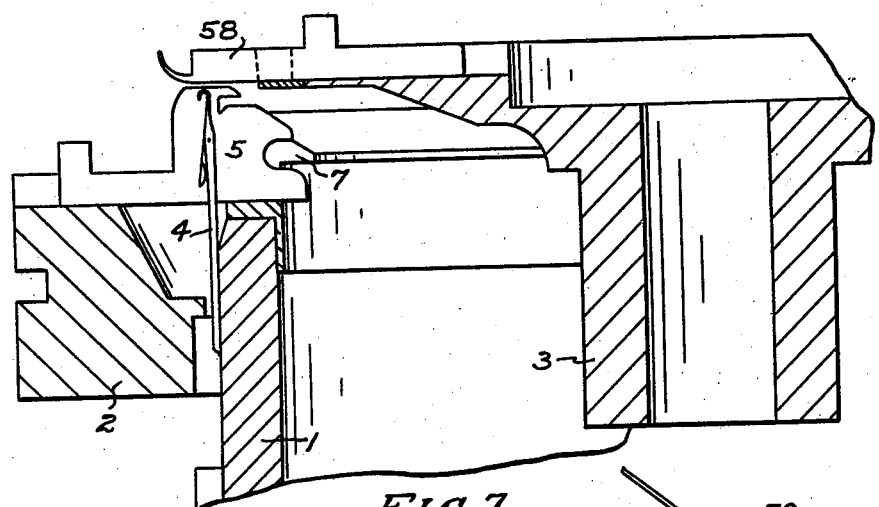
FIG. 7.
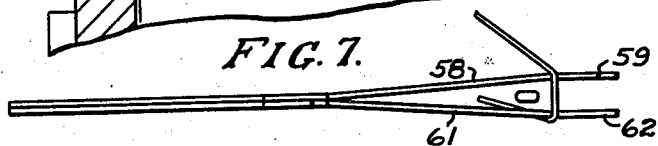
FIG. 8.   FIG. 9.
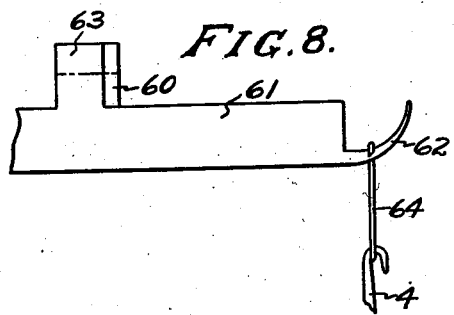   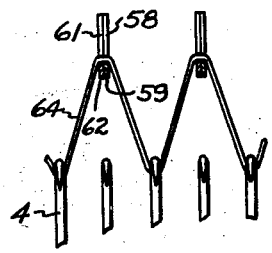
FIG. 10.   FIG. 11.   FIG. 12.
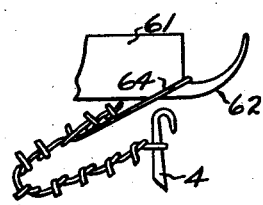   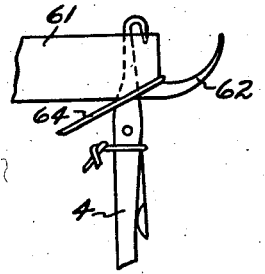   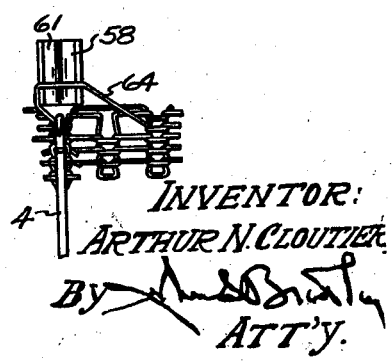
INVENTOR:
ARTHUR N. CLOUTIER
BY
ATT'Y.

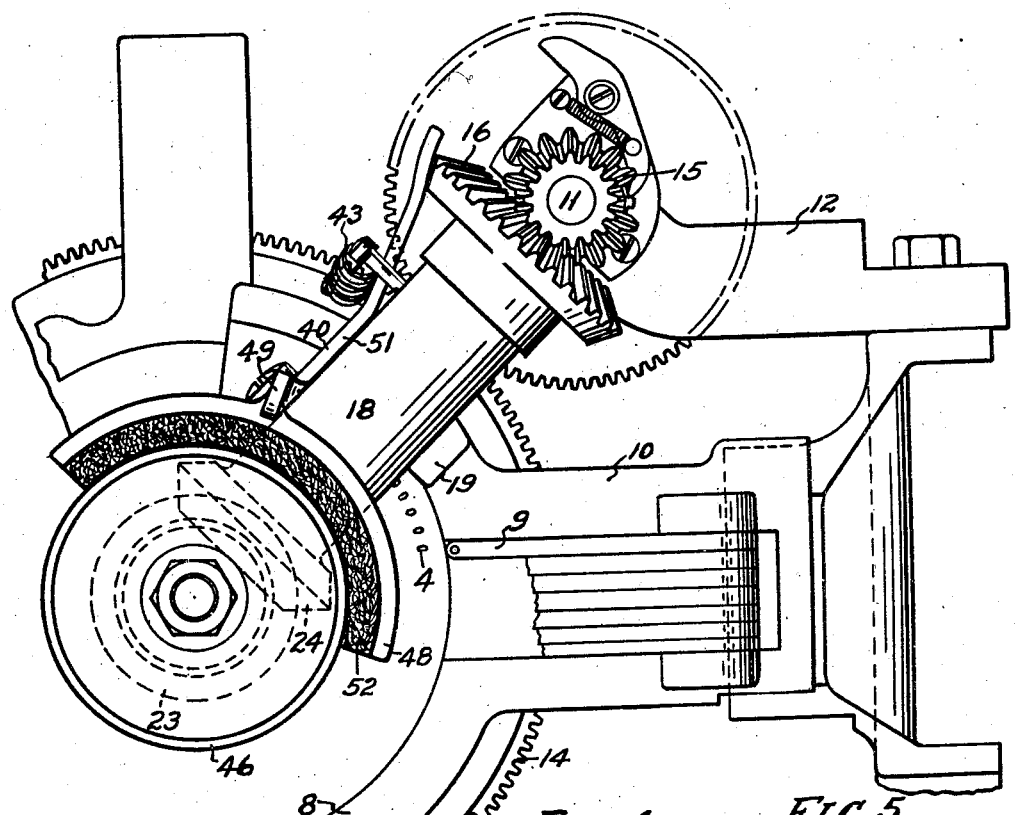
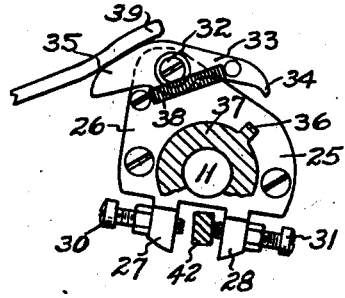
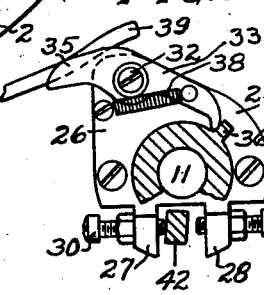
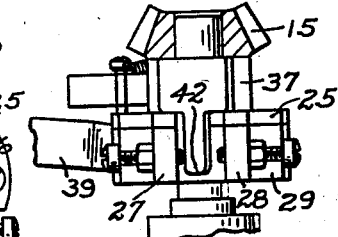

Feb. 20, 1945.　　A. N. CLOUTIER　　2,369,774
METHOD OF KNITTING
Original Filed May 29, 1943　　6 Sheets-Sheet 4

INVENTOR:
ARTHUR N. CLOUTIER,
BY
ATT'Y.

Feb. 20, 1945.   A. N. CLOUTIER   2,369,774
METHOD OF KNITTING
Original Filed May 29, 1943   6 Sheets-Sheet 5

INVENTOR:
ARTHUR N. CLOUTIER
By
ATT'Y.

Feb. 20, 1945.   A. N. CLOUTIER   2,369,774
METHOD OF KNITTING
Original Filed May 29, 1943   6 Sheets-Sheet 6

INVENTOR:
ARTHUR N. CLOUTIER,
BY
ATT'Y.

Patented Feb. 20, 1945

2,369,774

UNITED STATES PATENT OFFICE 2,369,774

METHOD OF KNITTING

Arthur N. Cloutier, Lonsdale, R. I., assignor to Hemphill Company, Central Falls, R. I., a corporation of Massachusetts Original application May 29, 1943, Serial No. 489,002. Divided and this application January 19, 1944, Serial No. 518,819

5 Claims. (Cl. 66—41)

This case is a division of application Serial #489,002, filed May 29, 1943.

This case concerns an invention in knitting machines of the circular, independent needle type such as are used for knitting hosiery. The machines to which this invention particularly applies knit seamless hosiery such as for ladies' wear having a so-called inturned welt. In addition to that welt, the remaining parts of the stocking may be knitted in a known or in any other manner.

In practicing the invention a cylinder and dial are employed, the cylinder having latch needles which function in conjunction with cooperating sinkers to knit plain fabric. The dial, driven to rotate in synchronism with the cylinder, has a plurality of bits or loop holding and transferring instruments. These bits function in pairs and there are one half as many pairs as there are needles in the cylinder. In other words, there is one pair of bits for every other needle.

At the start, yarn is taken by certain of the needles and is also taken over the bits and these bits hold the loops drawn over them until such time as it is again desired to transfer those loops back to the needles. A welt of any desired size may be knitted between the time of taking loops to be held by the bits and the subsequent transferring of those loops back to the needles.

Preferably, alternate needles are provided with jack or other selective controlling means so that those needles may be raised to take yarn or to take a transferred loop without raising the remaining or intermediate needles.

This control of alternate needles and an accompanying shogging movement make it unnecessary to having a double jack control, also allows raising only those needles which are to take loops. As a result of that, the bits may be caused to spread their loops to a greater extent than according to other practices, and accordingly, transferring is effected with a greater degree of security.

In addition to the above certain improvements of the transfer bits themselves will be evident from the following description of the mechanism and its operation with reference to the accompanying figures of drawings.

In the figures of drawings:

Fig. 2 is a plan view of the mechanism of Fig. 1.

Figs. 3, 4 and 5 are detailed views of the driving and shogging mechanism in its different positions.

Fig. 6 is a section through part of the cylinder and dial showing construction of those elements, also a needle, a sinker and a transfer bit.

Fig. 7 is a plan view of transfer bits as their loops of yarn are to be transferred by them.

Figs. 8 and 9 are views showing transfer bits and needles as they have drawn yarn preparatory to starting knitting an inturned welt.

Fig. 10 shows transfer bits as a loop is held in position for the projection of a needle through that loop.

Fig. 11 is a view similar to Fig. 10 but at a later point in the cycle after the needle has been projected between the bits and through the loop.

Fig. 12 is a view similar to Fig. 10 but showing the manner in which the loop has been shogged over for the reception of the proper cylinder needle.

Figure 1:
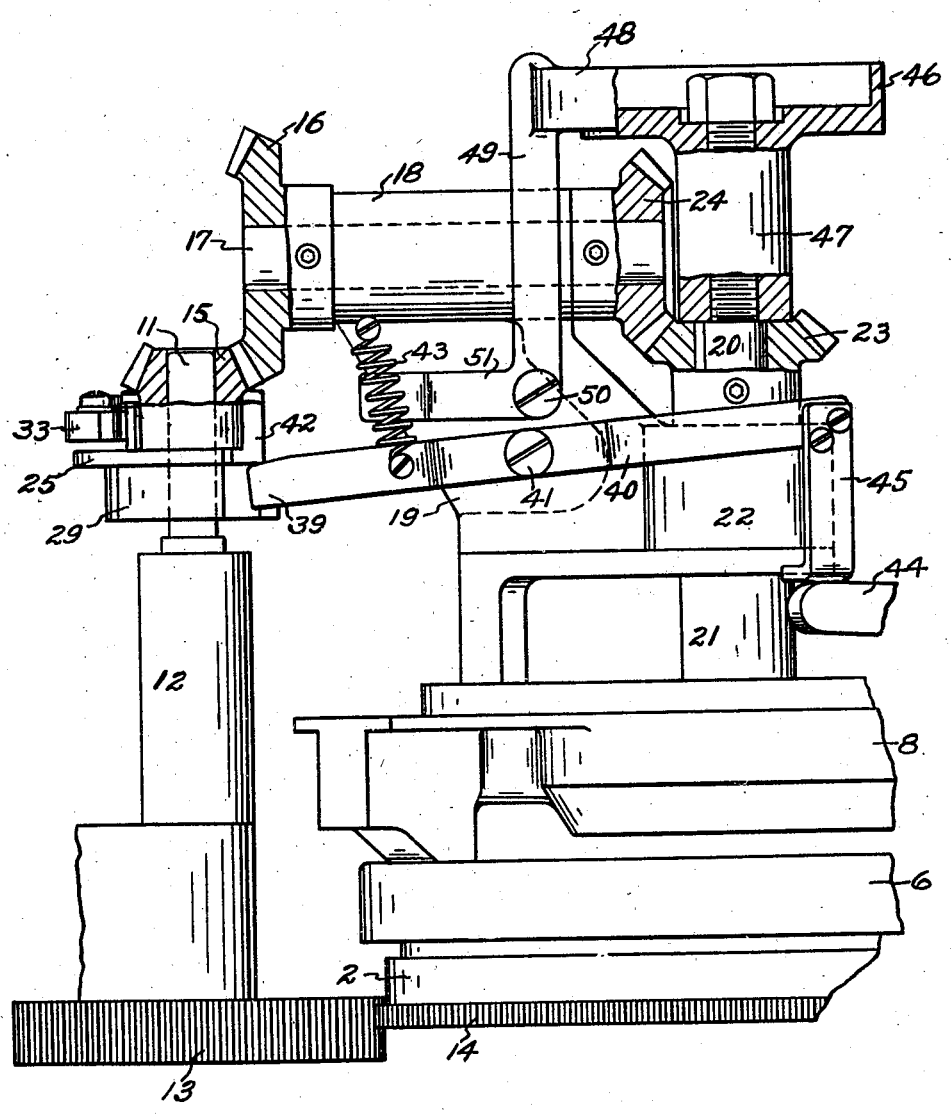
Fig. 1 is an elevation, certain parts being shown in section, illustrating the dial driving and shogging means.

Now referring to Figs. 1, 2 and 6, the invention has been illustrated in a typical hosiery knitting machine having a rotatable type needle cylinder 1, a sinker head 2 and a dial generally indicated by numeral 3. The usual latch type needles 4 are mounted for reciprocation in slots in the cylinder and cooperating therewith, sinkers 5 are controlled by the sinker cams of a sinker cam cap 6. These sinkers are guided in the sinker head and also within a stitch ring 7.

A carrier ring 8 is hinged at the back of the machine and performs the usual functions of that particular element. A plurality of yarn feeding levers 9 are hinged in the extension 10 of the carrier ring, one of those levers being shown in active position.

The dial is driven by gearing shown in Figs. 1 and 2, also through a shogging mechanism which will be described in detail later. A shaft 11 is rotatable in bearings within bracket 12 and that shaft carries at its lower end a gear 13 which meshes with a ring gear 14 fixed at the outer edge of the sinker head 2. At the upper end of the shaft a bevel gear 15 meshes with a second bevel gear 16 on a horizontal shaft 17. The horizontal shaft 17 is freely rotatable in a bearing 18 in the bracket 19, said bracket 19 being fixed to the carrier ring 8 and also serving as a bearing for the second vertical shaft which carries the dial. The dial itself is keyed to a central shaft 20 rotatable within a sleeve 21, the said sleeve being clamped in a boss 22 extending from the bracket 19.

The sleeve 21 is not rotatable and has attached at its lower end the cam mechanism for the dial. The spindle 20 has fixed thereto a bevel gear 23 which meshes with a similar bevel gear 24 on the shaft 17. Gears 16 and 24 are both fixed to the shaft 17 and the gear 23 and the dial are fixed to the shaft 20.

Now referring to Figs. 3, 4 and 5 in addition to Figs. 1 and 2, the shaft 11 has fixed thereto a plate 25 which has an extension 26 and projecting lugs 27 and 28. This plate is fixed by means of screws to a collar 29 which is in turn clamped to the shaft 11. An adjustable screw 30 is threaded into the lug 27 and a similar screw 31 is threaded into the opposite lug 28. Locking nuts hold these in any adjusted position.

The extension 26 has pivoted at 32 a latch 33 having a point 34 and an extending end 35. This latch is maintained in engagement with a projection 36 on the collar 37 except at such times as the latch is tripped. A spring 38 maintains the latch in that position, Figs. 2 and 4, except when the end 39 of a lever 40 pivoted at 41 is moved to press against the end 35 of the latch for disengaging it. At that time, as shown in Fig. 3, the point 34 of the latch will be swung outwardly against the tension of spring 38 and the drive will no longer be through the latch, but will be accomplished by engagement of the screw 31 with projection 42 which extends downwardly from the collar 37, or a projection from that collar. The collar 37 is really an extension or hub of the gear 15, or may be made separately and the two rigidly attached.

After disconnecting the latch as above described, the drive takes place positively, but in a shogged or displaced relationship so that different needles will align with bits than aligned with them originally. By adjustment, the shogging movement may be for an extent of one needle or more or may be of any desired degree found practical for accomplishing the particular purpose at hand.

The lever 40 is pulled upwardly by a spring 43 except when moved to the position of Fig. 1 by a lever 44 contacting with the offset member 45 which is attached at the outer end of lever 40. Lever 44 extends downwardly to be connected for actuation by certain cams on the main cam shaft of the machine. Such cams are commonly used and their description is not necessary at this time.

A brake drum 46 has a hub 47 threaded and locked or otherwise suitably secured to rotate with the shaft 20. A brake shoe 48 is attached to the upper end of a bell crank lever 49 pivoted at 50. That lever has a horizontal offset portion 51 which is engaged by the lever 40 whenever that lever is to be released to be drawn upwardly by spring 43. The spring 43 is of sufficient strength to move the lever 40 as desired and also to apply the brake 48 against the drum 46 so that when the shogging movement occurs, the driven mechanism will immediately be retarded to drive through the lug 28 rather than by means of the latch and the projection 36. The brake shoe 48 has a liner 52 made of leather or other suitable friction material.

Figure 16:
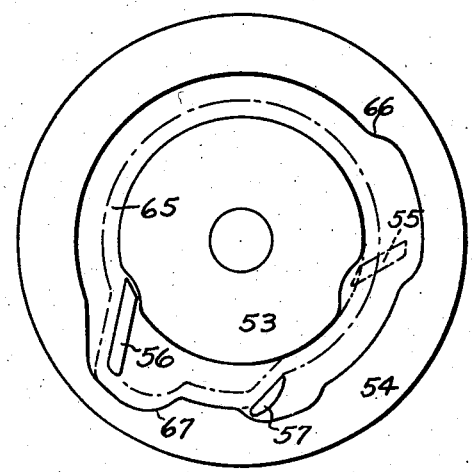
Fig. 16 is a plan view of dial cams and the pathway of butts on transfer bits.

As before stated, alternate ones of the needles 4 are provided with jacks and may be controlled separately from the intermediate needles. There are two forms of bits which may be used and the general principles of the invention apply no matter which of those bits is employed. The bits are arranged in pairs in radial slots in the dial 3 and are controlled by cams attached as is the usual practice within a dial cap and capable of being moved at appropriate times so as to guide the bits in desired pathways. As shown in Fig. 16, the dial cap carries cams 53 and 54 which are fixed in position and which really determine the outermost or innermost paths of travel for the butts of the bits. Cam 55 may be called a knitting cam and operates at such time as bits are to be moved outwardly for taking the yarn over their points. Cam 56 is a transfer cam and that moves bits outwardly to a maximum extent at the time needles are to come up through extended loops after the complete inturned welt has been formed. Cam 57 acts in conjunction with cam 54 to return the bits to an innermost or retracted position. Each one of these cams 55, 56 and 57 has controlling means similar to that described for the dial cams in U. S. Patent #2,255,068. Of course, other controlling means may be employed without changing the general principles upon which the mechanism functions.

Figure 19:
Figs. 19 and 20 show one transfer bit of a pair.
Figure 20:
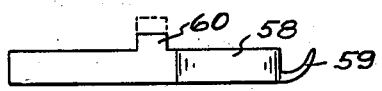
Figure 17:
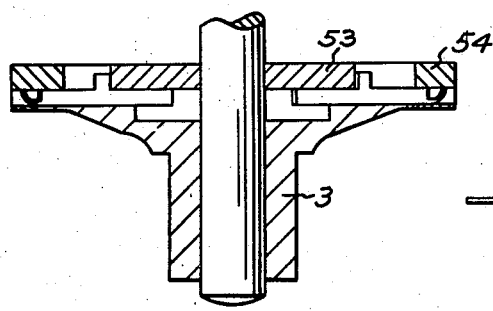
Fig. 17 is a section through the dial showing transfer bits fully retracted.
Figure 21:
Figs. 21 and 22 show the opposite transfer bit employed to make up a pair.
Figure 22:

Referring to Figs. 19-22, a pair of bits are illustrated, the bits shown in Figs. 19 and 20 being the opposite one of a pair to that shown in Figs. 21 and 22. The bit shown in Figs. 19 and 20 and designated by numeral 58 has a point 59 and a butt 60. The bits herein illustrated have short butts, but it is to be understood that one half the group of bits have long butts and the other half short butts. The distinction in length is merely for the purpose of inserting the cams on the short butt group as is common practice.

Figure 14:
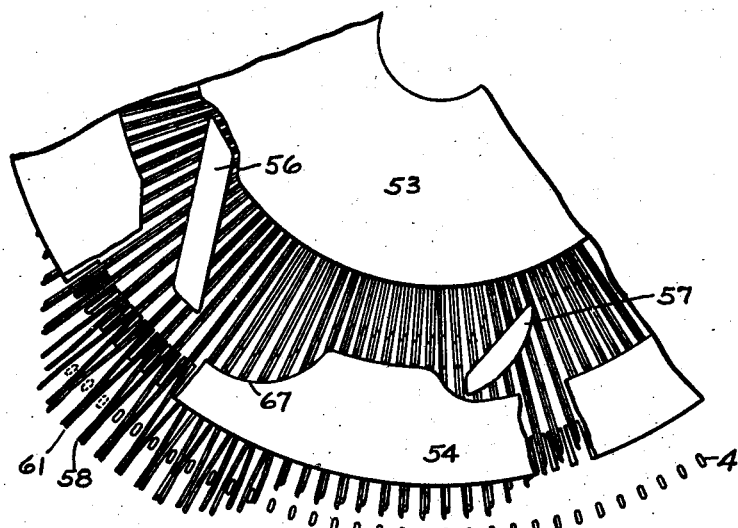
Fig. 14 is a similar detail of a sector of needles and points, but at the opposite side of the machine at which transferring takes place.
Figure 15:
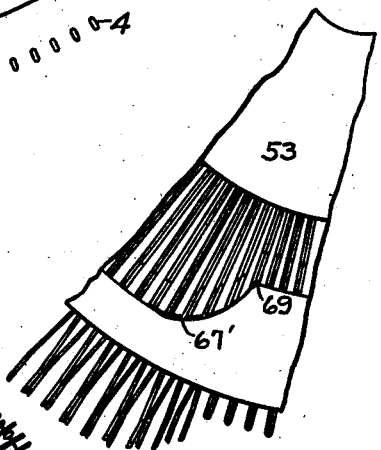
Fig. 15 is a view similar to Fig. 14 but showing a modification in which the butts on bits are differently constructed, also a different type cam is used.

The opposite bit 61 has a point 62 and a butt 63. The bits 58 and 61 which form a pair are identical except for the width of their butts and the fact that bit 58 is bent in the opposite direction from bit 61 so that when assembled and inserted to project from a slot in the dial, they will spread outwardly as in Fig. 7. This spreading action is restrained when the bits are withdrawn into the dial slots as illustrated in Figs. 13, 14 and 15.

Bit 61 has a narrower butt 63 than the bit 58.

The distinction is clearly shown in Figs 7 and 8 in which a pair of bits are shown, those in Fig. 7 being spread to present a loop to a needle, while those of Figs. 8 and 9 are illustrated in a position in which they take on yarn as at starting the inturned welt. The butt 60 is wider than the butt 63 and the reason for that distinction will be pointed out in a later paragraph. At the start of the inturned welt a selvage is first knitted and then a course of loops 64 are drawn over the bits, the alternate needles 4 being raised to take and draw the yarn while the points 59 and 62 of the bits are projected outwardly as in Fig. 13.

Figure 13:
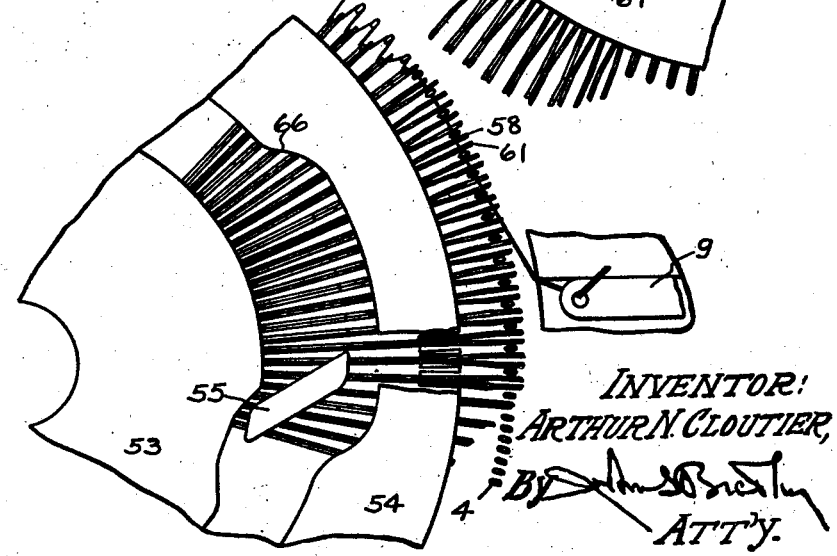
Fig. 13 is a detailed view of a sector of needles and bits adjacent the feeding point at which time yarn is being taken by the needles and over the points.

In Fig. 13 the yarn feeding lever 9 is feeding a yarn to alternate ones of the needles 4, those alternate needles being raised by appropriate cams acting on jacks. The bits which have been moving in an inner pathway such as the pathway 65, Fig. 16, have their butts engaged by cam 55 which has been moved to active position. That cam 55 moves the bits outwardly so that their points assume the position shown in Fig. 13 and in the enlarged views, Figs. 8 and 9. That projection of bits is not sufficient to spread the points more than a slight amount. In other words, the bits have not been moved out of their slots far enough so that the tendency for the points to spring apart can be fully exerted.

The bits are moved outwardly with the leading bit 58 being projected out ahead of the accompanying bit 61. However, when the outermost point of projection has been reached under the influence of cam 55, those bits each assume a uniform or evenly projected position. They travel in a concentric path until the cam portion 66 of the cam 54 is reached. At that time the bits are drawn inwardly, the leading bit 58 moving in well ahead of the accompanying bit 61 of each pair. After at least a full course of loops 64 have been taken by the bits, the cam 55 will be withdrawn and all bits will remain in the position to which they are moved by cam 66. As many courses as desired are then formed by knitting on all needles until a desired length of fabric for a doubled or inturned welt is completed. A projecting finger is to be inserted between the dial and cylinder needles during the knitting of the inturned welt so as to push the fabric inwardly thereby to create a proper fold and avoid interference with or piling up of fabric at the needles.

After a sufficient extent of fabric has been knitted for an inturned welt, a transfer back to the needles is effected. During the part of the cycle described to this point, the drive for the dial has been through the latch point 34 and the projection 36 as illustrated in Fig. 4, otherwise, in a direct or unshogged driving relationship.

The knitting is continued during transfer, but cams 56 and 57 are moved into active position whereupon the bits are pushed outwardly as shown in Fig. 14 at which time alternate needles will again be raised by the jack mechanism and appropriate cams. The dial is also shogged just preparatory to transferring since, as shown in Fig. 13, the needles come up between or to the sides of pairs of bits whereas at the transfer, needles rise through each pair of bits to remove the loop therefrom.

Cam 56 pushes the bits outwardly to fullest extent and at that time, needles are not raised quite as high as the lower edge of the bits, see Fig. 10. As the bits reach their outermost point they spring apart as shown in Figs. 7 and 12 extending the loop held on their points so that in the shogged position of the dial, the needles may then be moved upwardly through the loop and through each pair of bits, see Fig. 11.

After the needles have been moved upwardly and have engaged within their respective loops, bits are withdrawn by the cam surface 67 which serves to move them partway in and thereafter cam 57 returns them to the innermost point or pathway 65. The reason for having butts of different widths such as the butts 60 and 63 is that as is evident in Fig. 14, the leading bit of each pair will be moved inwardly ahead of or in advance of the other bit of that pair. Since the butt 60 is of additional width, and that additional width is toward the point of the bit, the incline of the cam 57 acts in conjunction therewith to start movement of that bit which has a wider butt well in advance of the accompanying bit having a butt 63. The resulting action causes the point 59 on the leading one of each pair of bits to drop its loop first and thereafter the point 62 on the second one of each pair of bits will release its loop. This prevents pinching the yarn at the point of transfer as is sometimes experienced if the bits are retracted together.

Figure 24:
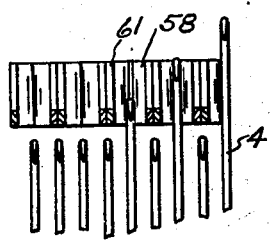
Fig. 24 is a detail of a few needles and bits showing projection of needles through or between the bits at transfer.

As shown in Fig. 24 only the alternate ones of the needles 4 are raised. Since the dial is shogged after taking loops on the bits and prior to transferring from them, it is possible to raise the same group of alternate needles and thus only one set of jacks and provision for raising them is required. Of course, if the shogging were not provided, two sets of jacks or the equivalent would be necessary for raising one group of needles during taking on and the opposite group at transfer. According to the practice heretofore in effect, all needles have been raised at both places so that while only one means of selection or one provision for raising all needles at each point was called for, it was not possible to spread the pairs of bits to such an extent as is possible by the system herein described. The result is that in transferring back onto needles, there is about twice as much room for raising the needles to which each loop is to be transferred without missing that loop. The transfer is thus made exceedingly safe.

In Fig. 12 one needle and a pair of transfer bits are illustrated and these are shown after the shogging movement has taken place and while the loop held on the points has been extended laterally to a maximum degree.

Figure 18:
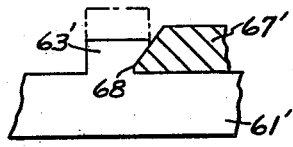
Fig. 18 is a detail greatly enlarged and showing a modified form of transfer bits and the cam which functions with those bits.
Figure 23:
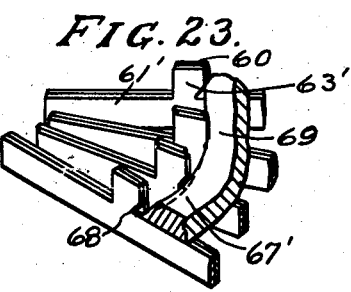
Fig. 23 is an isometric view showing the manner in which bits are controlled by the transferring cam when those bits are constructed as in Fig. 18.

Now referring to Figs. 15, 18 and 23 a modified form of butt to be used on one of the bits and the cam employed therewith is shown. In Fig. 18 the bit 61' has a butt 63' which as can be seen, is beveled or notched as at 68. The corresponding butt on the other one of the bits is of the same width at its upper edge but has no notch. The cam 67' is beveled where the butts first start to contact it and the angle of that bevel grows less acute until the edge of the cam is vertically disposed at the point 69.

The action is such that at the transfer side of the machine, the leading bits having rectangular shaped butts 60 are drawn inwardly by the point of the beveled cam 67'. Due to the presence of the notch 68 in the butts 63', the second one of each pair of bits is not moved in so quickly nor to so great an extent. This allows the loop being transferred to be withdrawn from the point of the leading one of each pair of bits first and thereafter to be quickly slipped off the second one of the points as the notched butt 63' engages the flattened or non-beveled part of the cam adjacent the point 69. At that point and thereafter, both bits are drawn inwardly to the same extent, that extent being sufficient to shed the loop from the points completely. This action avoids pinching the yarn in the loop to be transferred as in the first instance, but also provides that both points shall be drawn in to the same extent at the point 69, also that the second one of the points may shed its loop more quickly and with more certainty. After passing the point 69 the bits will be drawn completely within the dial by cam 57.

Figure 25:
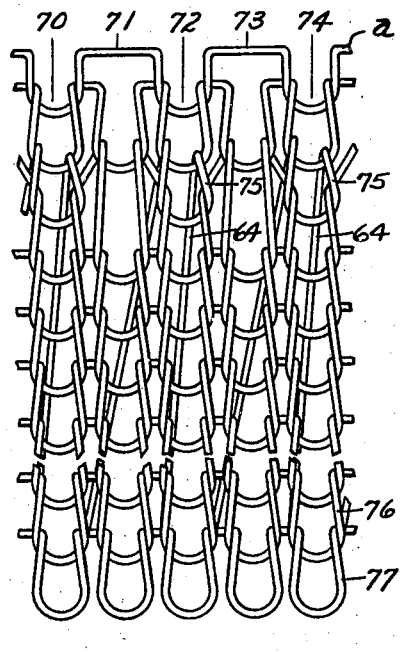
Fig. 25 is a conventional illustration of the fabric as it is theoretically pictured.

In Fig. 25 the theoretical construction and method of producing the fabric has been illustrated. At the start yarn *a* is fed to alternate needles, that is, to needles knitting in alternate wales 70, 72 and 74. In the next course that same yarn is taken by all needles and thus knits in all the wales 70—74 casting off the previously drawn yarn to form a selvage. Then the yarn is again fed to alternate needles but the bits are projected outwardly at that time as illustrated in Figs. 8 and 9 so that the loops 64 will be drawn over their points. In some of the figures the points are shown together as yarn is drawn over them, but it is to be understood that the taking on position generally allows the points to become separated to a slight degree. The loops designated by numeral 75 are knitted in wales 70, 72 and 74. Thereafter all needles knit at each course so that a loop of yarn is formed at each wale 70—74 and in each course until the completion of as much fabric as is desired for the inturned welt.

As the course 76 is drawn, the transfer function takes place simultaneously so that each of the needles takes on a loop of the yarn at the feeding station, but at the transfer side of the machine, alternate needles will be raised so that the loops 64 held on the points of the bits will be transferred and taken by those needles. These loops 64 were originally intermediate the needles knitting in wales 70, 72 and 74, but the dial will have ben shogged a distance of the space between needles so that those loops which really aligned with the wales 71 and 73 up to the point of shogging will actually be transferred to accompany stitches in the wales 70, 72 and 74. Then when the course 77 is knitted, the stitches thereof will be drawn through doubled loops in wales 70, 72 and 74, but through single loops only in the intermediate wales.

Figure 26:
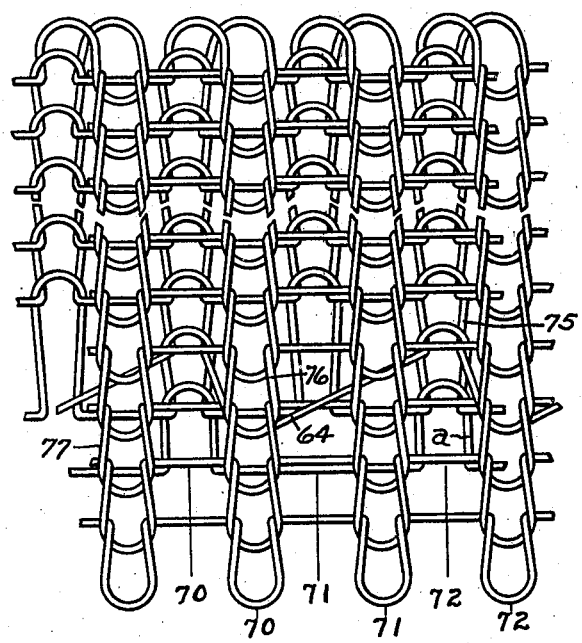
Fig. 26 is a conventional illustration of the fabric greatly enlarged by showing an inturned welt practically as the same would appear when completed.

In Fig. 26 the actual construction of the fabric is more accurately shown. Of course, the loops 64 are greatly elongated in Fig. 25 since that figure is merely theoretical and the fabric has not been folded or doubled over. In Fig. 26 corresponding loops and wales are given similar numbers to those employed in Fig. 25.

Operation

At the start a selvage is first to be knitted in any desired manner. Here that selvage is formed according to the method just described with respect to the first courses in Fig. 25, and in the third course, the jack control is employed to raise alternate needles only for taking the yarn fed by the appropriate one of the yarn feeding levers, Fig. 13. At that time the dial is driving in a normal way, latch 33 being in engagement with the projection 36, Fig. 4. Just prior to drawing this third course the bits are moved outwardly by the cam 55. After a loop such as the loop 64 has been taken on each of the bits and by alternate needles, the bits are drawn inwardly under the influence of cam 66, Fig. 13, and knitting continues on all needles until a requisite length of fabric is formed.

At the transfer, cams 56 and 57 are moved to active position and the dial is shogged prior to that time so that when bits are moved outwardly, they move out over those needles upon which the yarn was taken and drawn. At the transfer side of the machine while knitting is still continuing at all needles at the knitting point, bits are moved outwardly to such an extent that their natural tendency to spring apart causes them to open the loops held on their points so that the alternate needles may project upwardly through those loops. The jack control is caused to function in conjunction with the cam control of Fig. 14 and after all loops have been taken from the bits to their respective needles, the bits are returned to their innermost pathway and the cams 56 and 57 are withdrawn. Knitting then continues with the same yarn or after a yarn change as desired.

The above described operation is generally the same no matter which type of bit is employed. The sequence of operations and control exercised by the various cams is the same and the only distinction is in the particular movements imparted to the bits as dictated by the differently shaped butts and by the cam 67' functioning instead of cam 67.

The invention has been described relative to one embodiment of the same and it is to be understood that variations may be resorted to without departing from the scope of the invention as originally conceived. The invention is defined in the appended claims.

I claim:

1. A method of knitting an inturned welt in a circular, independent needle knitting machine including the steps of feeding yarn to spaced needles only and over points of transfer bits, knitting fabric on all needles throughout an extent sufficient for an inturned welt and thereafter transferring loops held on transfer bits to the same needles upon which yarn was initially taken.

2. A method of knitting an inturned welt in a circular, independent needle knitting machine which includes the steps of feeding a yarn to alternate needles only of a series and over points of transfer bits intermediate the said alternate needles, then relatively moving said transfer bits to align with those needles to which the yarn was initially fed and transferring the loops from the bits on to the said needles.

3. A method of knitting an inturned welt in a circular, independent needle knitting machine which includes the steps of projecting transfer bits outwardly so that their points extend over and between alternate ones of a circle of needles, feeding a yarn to said alternate needles only and over points of said bits, then withdrawing said bits while the loops are retained on their points and knitting a plurality of courses on all needles, then relatively moving points with respect to needles so that the bits will align with said alternate needles, projecting points outwardly over said needles to spread loops held thereon and moving said needles upwardly through said loops thereby to take them from the points whereupon knitting is continued on all needles and bits are withdrawn to an inactive position.

4. A method of producing an inturned welt upon a circular, independent needle, knitting machine provided with radially movable transfer bits each consisting of a pair of individual blades which includes the steps of causing the needles and both blades of transfer bits to take yarns in alternation, thereafter transferring the yarn from the bits to the needles and, when so transferring, causing one blade of each bit to move inwardly in advance of the other blade of the same bit so that the yarn will slip from one blade before disengaging from the other.

5. A method of producing an inturned welt upon a circular, independent needle, knitting machine provided with transfer bits each consisting of a pair of separate blades which includes the steps of projecting the bits outwardly with both blades of each bit in substantially parallel alignment causing needles and both blades of each bit to take yarn in alternation, knitting the welt on all the needles, then causing the blades of each bit to separate so as to straddle an adjacent needle and transferring the yarn from the bits to the needles by drawing inwardly one blade of each bit before the other so that the yarn will be disengaged from one blade before the other.

ARTHUR N. CLOUTIER.